W. H. KENNEDY.
COUPLING.
APPLICATION FILED MAR. 15, 1913.
1,069,146.
Patented Aug. 5, 1913.
2 SHEETS—SHEET 1.
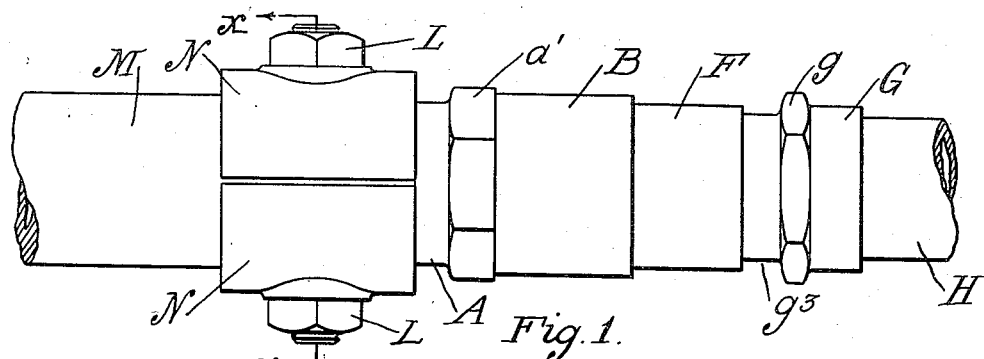
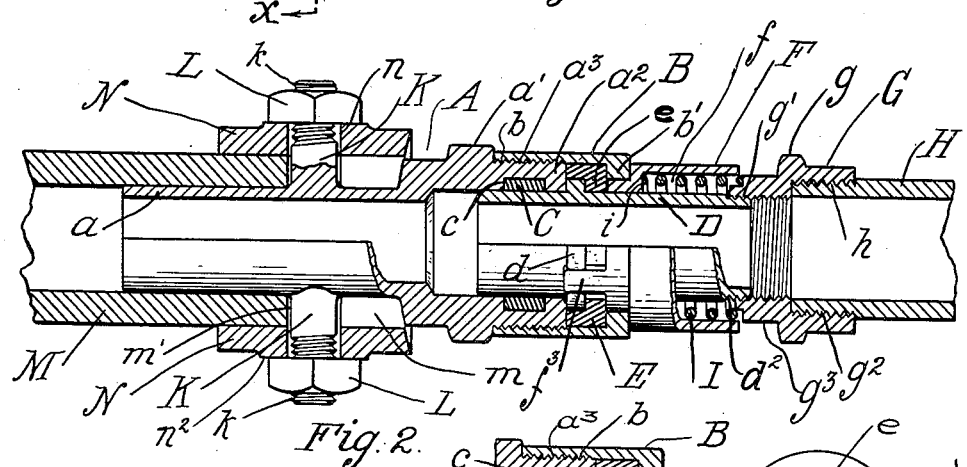
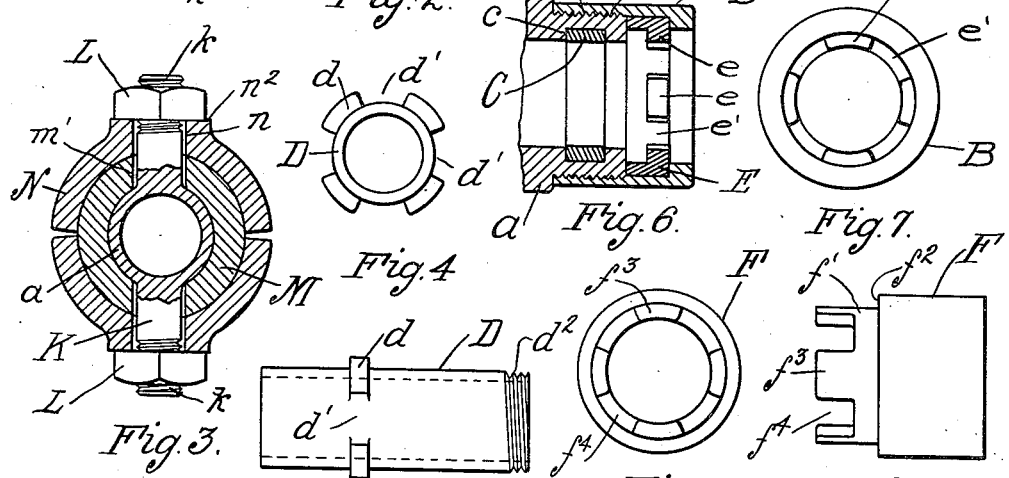
Witnesses.
Albert G. Piczenthowski;
Marguerite H. Livsey
Inventor.
William H. Kennedy
By Horatio E. Bellows
Attorney.

W. H. KENNEDY.
COUPLING.
APPLICATION FILED MAR. 15, 1913.

1,069,146.

Patented Aug. 5, 1913.
2 SHEETS—SHEET 2.

Witnesses.
Albert G. Rzegenthowski
Marguerite H. Livsey

Inventor.
William H. Kennedy
By Horatio E. Bellows
Attorney.

UNITED STATES PATENT OFFICE.

WILLIAM H. KENNEDY, OF CHICAGO, ILLINOIS.

COUPLING.

1,069,146.  Specification of Letters Patent.  Patented Aug. 5, 1913.

Application filed March 15, 1913. Serial No. 754,540.

*To all whom it may concern:*

Be it known that I, WILLIAM H. KENNEDY, a citizen of the United States, residing at Chicago, in the county of Cook and State of Illinois, have invented certain new and useful Improvements in Couplings, of which the following is a specification.

My invention relates to couplings well adapted, among other uses, for hose, and has for its essential objects the combination in a single structure of a swiveling and an interlocking action whereby any kinks or torsion of the attached hose will not interfere with the efficiency of the operation of the interlocked parts; also to insure a facile swiveling action under high pressure, combined with a maximum of strength, and a minimum of wear; and to prevent accidental disengagement of the members.

To the above ends essentially my invention consists in such parts and such combinations of parts as fall within the scope of the appended claims.

Figure 10:
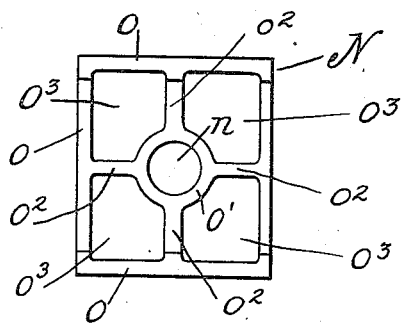
Figure 11:
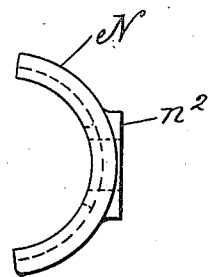
Figure 12:
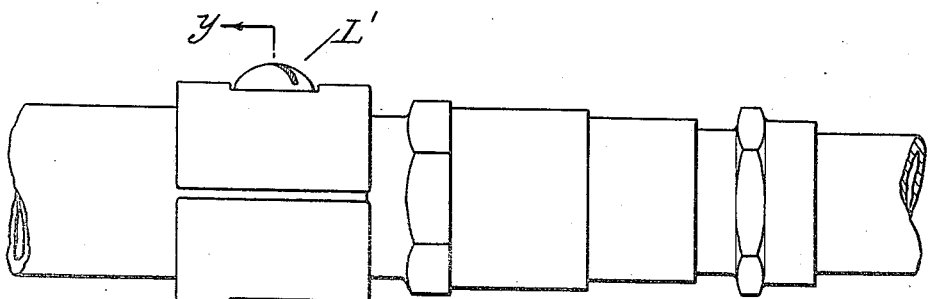
Figure 13:
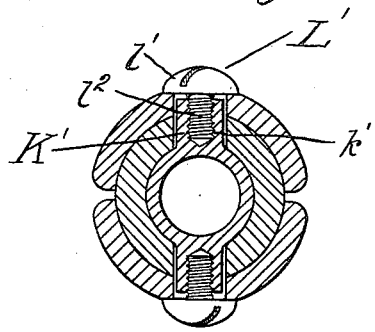
Figure 14:
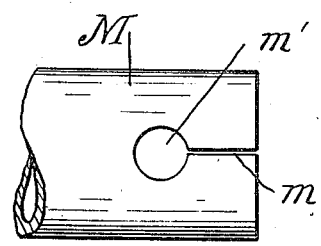

In the accompanying drawings which form a part of this specification:—Figure 1 is a side elevation of my hose coupling, Fig. 2, a longitudinal central section of the same, showing parts broken away and partially in side elevation, Fig. 3, a section on line $x$ $x$ of Fig. 1, Figs. 4 and 5, end and side elevations respectively of one coupling member, Fig. 6, a longitudinal section of the operating end of one coupling member disengaged from its combination member, Fig. 7, an end elevation of the same, Figs. 8 and 9, end and side elevations respectively of the locking sleeve, Figs. 10 and 11, rear and side elevations respectively of one of the clamping plates, Fig. 12, a side elevation of a modified form of my clamping device, Fig. 13, a section of the same on line $y$ $y$ of Fig. 12, and Fig. 14, a plan of the end portion of a hose before engagement.

My coupling comprises in detail a tubular male member A comprising a reduced end or shank portion $a$, an exteriorly intermediate portion $a'$, and an inner end portion $a^2$ provided in the present instance with external threads $a^3$ engaging the interior threads $b$ of a ring B provided with an inwardly directed flange $b'$ interspaced from the end face of the portion $a^2$. When the parts are finally assembled the ring B constitutes for all practical purposes a part of the member A. An annular packing ring C may if desired be seated in an internal annular cavity $c$ in the member A.

A tubular male member D has intermediate its length two or more annularly disposed radial lugs $d$ with resultant spaces $d'$, and upon its outer end external threads $d^2$. Rotatable exteriorly of the member D in contact with the member B and retained by the flange $b'$, is a ring E having an internal diameter sufficient to receive the lugs $d$, and provided with inwardly directed radially disposed lugs $e$ with intervening spaces $e'$. The spaces $e'$ are of such dimensions as to allow the lugs $d$ to pass intermediate the lugs $e$ as a sliding fit, and a partial turn of the member D serves to bring the lugs $d$ into a longitudinal alinement with the lugs $e$ at their rear, and the spaces $d'$ are at the same time brought into longitudinal alinement with the spaces $e'$.

Loose upon the member D is a locking tube or ring F of a large internal bore throughout a portion of its length forming a recess $f$ and having the exterior of its inner end $f'$ reduced to form an annular shoulder $f^2$ adapted to bear against the portion $b'$ of the member B. Integral with the portion $f'$ are square projections $f^3$ forming resultant spaces $f^4$. The projections $f^3$ are of such dimensions as to slide through the spaces $d'$ and $e'$, and thus engage the lugs $d$ and $e$ so that the lugs can not rotate relatively to each other, thus preventing detachment of the members A and D. The member F however is when engaged rotatable relatively to the member A, but is held against escape longitudinally by a nut G. This nut is provided with a hexed exterior portion $g$ adapted to accommodate a wrench and has near its inner end internal threads $g'$ adapted to engage the threads $d^2$ upon the member D. It is also provided near its outer end with internal threads $g^2$ adapted to engage threads $h$ upon the end of a hose or pipe H. The nut G is of sufficiently reduced diameter at its forward portion, as at $g^3$, to permit the entrance within the cavity $f$ of the member F, pressed against one end of a helical spring I which surrounds the member D within the cavity, and has its opposite end pressing against the member F at the base of the bore or cavity as at $i$. It will be observed that the pressure of the spring which abuts against the inner end of the member G acting against the shoulder $i$ yieldingly forces the projections $f^3$ of the member F into their seats intermediate the lugs $d$ and $e$.

The assembling of the coupling has been already somewhat described. The female member A or A, B, carries permanently the rotary ring E. The male coupling member D is inserted within the member A, the lugs $d$ passing through the spaces $e'$, and then passing, by a turn of the member D, behind and in longitudinal alinement with the lugs $e$, leaving the spaces $d'$, $e'$ in alinement. Into these spaces the lugs $f^3$ are inserted by the forward impulsion of the member F under the pressure of the spring I, whose pressure is regulated by the nut G. In the described position the coupling is locked against accidental disengagement, while not interfering with the swiveling of the parts E, D, F, and G relatively to the member A or A, B. To disconnect the coupling thus engaged the member F is manually pulled rearwardly against the tension of the spring I until the projections $f^3$ have been withdrawn from the opening $d'$, $e'$, and then slightly turned so that the ends of the projections $f^3$ are opposite the faces of the lugs $e$, and then by a turning of the member A relatively to the member G the lugs $d$ of the member D are turned sufficiently to pass through the openings $e'$ and permit the escape of the member D from engagement.

Cast upon the shank portion $a$ of the coupling member A, at an intermediate portion thereof, are diametrically oppositely disposed bosses or projections K provided with threaded end portions $k$ adapted to receive nuts L. The hose M is applied to the shank portion $a$ and is longitudinally slit at diametrically opposite points at its forward end as at $m$, and at the end of the slits is provided with circular openings $m'$. By means of the slit portions the hose may be forced upon the shank, the bosses K passing through the slits, and seating themselves in the openings $m'$. The end of the hose is clamped tightly upon the shank portion $a$ by means of curved or semicircular nuts or plates N which rest upon the exterior of the hose and conform with the shape thereof, and are each provided with a central opening $n$ to permit passage therethrough of the bosses K. The portions of the plates N around the openings $n$ are preferably flattened as at $n^2$ to form seats for the nuts L, by which nuts the plates are clamped upon the hose. In order to increase the engaging power of the plates N, they are provided upon their inner faces with ribs, as shown in Figs. 10 and 11. These ribs may be arranged in any preferred manner. In the present instance they comprise a marginal rectangular rib or ribs $o$, a central annular rib $o'$, and radial ribs $o^2$. These ribs form four depressions $o^3$ adapted to receive the material of the hose M as the plates N are compressed thereon.

In place of the nuts L screws L' may be employed as shown in Figs. 12 and 13. The screws comprise rounded head portions $l'$ and threaded shanks $l^2$ adapted to engage screw threads $k'$ formed in tubular bosses K'

What I claim is:—

1. In a coupling, the combination with a female member, of an axially movable ring mounted in said member provided with lugs, a male member loose in the ring provided with lugs engaging the lugs upon the ring, and a locking sleeve loose upon the male member provided with projections engaging the lugs upon both the ring and the male member, and means for causing engagement of said projections and lugs, and preventing displacement of the said members and allowing joint rotary movement of said lugs.

2. In a coupling, the combination of a female member, of a ring rotatably mounted in said member, inwardly directed lugs upon the ring, a male member extending into the ring, exterior lugs upon the male member adapted to engage the lugs upon the ring, a locking sleeve loose upon the male member, projections upon the sleeve adapted to engage the lugs upon both the ring and the male member, and resilient means upon the male member engaging the sleeve for forcing the projections into engagement with the lugs.

3. In a coupling, the combination with a female member, of an axially movable ring mounted in said member, lugs upon the ring, a male member loose in the ring, lugs upon the male member engaging the lugs upon the ring, a locking sleeve loose upon the male member provided with projections adapted to engage the lugs upon both the ring and the male member, and provided with an internal cavity, a spring upon the male member within said cavity, and a nut upon the male member pressing against one end of the spring.

4. In a coupling, the combination with a female member, of an independent ring rotatably mounted in said member, inwardly directed lugs upon the ring forming a series of openings, a male member loose in the ring, radial lugs upon the exterior of the male member forming a series of openings, the lugs upon the male member being adapted to pass through the openings in the ring, and a locking sleeve slidably mounted upon the male member provided with a cavity, a spring upon the male member within the cavity having one end pressing against the ring at one end of a cavity, said male member being provided at its end with a screw thread, and a hollow nut provided with threads at one end adapted to engage the threads upon the male member and abutting against one end of the spring, said nut being provided with an additional thread at its end opposite to the end engaging the male member.

In testimony whereof I have affixed my signature in presence of two witnesses.

WILLIAM H. KENNEDY.

Witnesses:
    LOUIS J. SUAREZ,
    BEDA M. SATTERLEE.